United States Patent
Pedersen

(10) Patent No.: US 11,851,883 B2
(45) Date of Patent: Dec. 26, 2023

(54) SYSTEM FOR MOUNTING GLASS ROOF TILES ON A ROOF CONSTRUCTION

(71) Applicant: SOLARTAG APS, Store Heddinge (DK)

(72) Inventor: Thomas Pedersen, Store Heddinge (DE)

(73) Assignee: SOLARTAG APS, Store Heddinge (DK)

(*) Notice: Subject to any disclaimer, the term of this patent is extended or adjusted under 35 U.S.C. 154(b) by 120 days.

(21) Appl. No.: 17/610,294

(22) PCT Filed: May 7, 2020

(86) PCT No.: PCT/EP2020/062753
§ 371 (c)(1),
(2) Date: Nov. 10, 2021

(87) PCT Pub. No.: WO2020/229307
PCT Pub. Date: Nov. 19, 2020

(65) Prior Publication Data
US 2022/0213688 A1 Jul. 7, 2022

(30) Foreign Application Priority Data
May 10, 2019 (EP) .................................... 19173803

(51) Int. Cl.
*E04D 1/16* (2006.01)
*H02S 20/23* (2014.01)
(Continued)

(52) U.S. Cl.
CPC .............. *E04D 1/16* (2013.01); *E04D 1/365* (2013.01); *E04D 3/06* (2013.01); *F24S 25/613* (2018.05);
(Continued)

(58) Field of Classification Search
CPC .. E04D 1/16; E04D 1/365; E04D 3/06; E04D 2001/3414; E04D 2001/3432; F24S 25/613; H02S 20/23; H02S 20/25
See application file for complete search history.

(56) References Cited

U.S. PATENT DOCUMENTS

| 5,274,978 A | 1/1994 | Perkonigg et al. |
| 7,872,092 B2 | 1/2011 | Fujii et al. |

(Continued)

FOREIGN PATENT DOCUMENTS

| CN | 202925776 U | * | 5/2013 | ............ H02S 20/00 |
| DE | 8709659 U1 | | 9/1987 | |

(Continued)

OTHER PUBLICATIONS

International Search Report and Written Opinion from PCT Application No. PCT/EP2020/062753, dated Jul. 22, 2020.
(Continued)

*Primary Examiner* — Jessie T Fonseca
(74) *Attorney, Agent, or Firm* — WORKMAN NYDEGGER

(57) ABSTRACT

A system for mounting glass roof tiles on a roof construction includes a roof batten, an S-shaped bracket defining a first U-shaped portion and a second U-shaped portion, a sealing plate and two glass roof tiles arranged side by side along a first longitudinal direction defined by the roof batten. The first U-shaped portion of the bracket is clamped onto the roof batten and retained in relation thereto solely by means of friction and gravity. An end portion of the sealing plate and a lower end portion of each of the glass roof tiles are snugly fit into the second U-shaped portion of the bracket. The glass roof tiles can be mounted on the roof construction in an easy and fast manner without the use of fastening means or tools.

15 Claims, 6 Drawing Sheets

(51) Int. Cl.
*E04D 1/36* (2006.01)
*E04D 3/06* (2006.01)
*H02S 20/25* (2014.01)
*F24S 25/613* (2018.01)
*E04D 1/34* (2006.01)

(52) U.S. Cl.
CPC .............. *H02S 20/23* (2014.12); *H02S 20/25* (2014.12); *E04D 2001/342* (2013.01); *E04D 2001/3414* (2013.01); *E04D 2001/3432* (2013.01)

(56) References Cited

U.S. PATENT DOCUMENTS

| | | | |
|---|---|---|---|
| 11,114,577 | B2 | 9/2021 | Kubo et al. |
| 2008/0236087 | A1* | 10/2008 | Hick .......................... E04D 1/34 52/546 |
| 2009/0272062 | A1* | 11/2009 | Gibbs ....................... E04D 1/34 52/553 |
| 2019/0068109 | A1 | 2/2019 | Chu et al. |
| 2019/0088802 | A1 | 3/2019 | Kang et al. |
| 2019/0221696 | A1 | 7/2019 | Kubo et al. |

FOREIGN PATENT DOCUMENTS

| | | | | |
|---|---|---|---|---|
| DE | 20317588 | U1 | 2/2004 | |
| DE | 202006017963 | U1 | 2/2007 | |
| DE | 202007005924 | U1 * | 12/2007 | ............... E04D 1/34 |
| DE | 102009006961 | A1 | 8/2010 | |
| EP | 0531869 | A2 | 3/1993 | |
| EP | 2055855 | A1 | 5/2009 | |
| EP | 2317246 | A2 * | 5/2011 | ............... F24J 2/465 |
| EP | 2784241 | A1 * | 10/2014 | ............... F24J 2/045 |
| EP | 2784241 | A1 | 10/2014 | |
| EP | 2921800 | A1 | 9/2015 | |
| EP | 3107206 | A1 | 12/2016 | |
| FR | 2931855 | A1 * | 12/2009 | ............... F24J 2/465 |
| JP | 2006328887 | A | 12/2006 | |
| WO | 0066853 | A1 | 11/2000 | |
| WO | WO-0066853 | A1 * | 11/2000 | ............... E04D 1/34 |
| WO | 2012120208 | A2 | 9/2012 | |
| WO | 2014045141 | A2 | 3/2014 | |
| WO | 2014045144 | A1 | 3/2014 | |
| WO | 2018061645 | A1 | 4/2018 | |
| WO | 2018089632 | A1 | 5/2018 | |

OTHER PUBLICATIONS

European Search Report from corresponding EP Application No. 19173803, dated Oct. 30, 2019.

* cited by examiner

SYSTEM FOR MOUNTING GLASS ROOF TILES ON A ROOF CONSTRUCTION

FIELD OF THE INVENTION

The present invention relates to a system for mounting glass roof tiles on a roof construction during building-up of the roof, the glass roof tiles forming part of the resulting roof. The glass roof tiles could, e.g., comprise photovoltaic elements. The system according to the invention allows the glass roof tiles to be mounted on the roof construction in an easy manner without the requirement of tools or fastening means, such as screws. The invention further provides a kit for use in the system and a method for mounting glass roof tiles on a roof construction, using the system.

BACKGROUND OF THE INVENTION

Roofs may comprise roof tiles made of a glass material. This is, e.g., the case when at least part of the roof comprises photovoltaic elements. The glass roof tiles need to be mounted on the roof construction, e.g. by attaching the glass roof tiles to roof battens. This could, e.g., be done by means of appropriate brackets and/or fastening means, such as screws.

EP 2 784 241 A1 discloses a roof construction comprising brackets mounted by means of screws on a roof batten. Roof tiles comprising photovoltaic elements are mounted in the brackets, and sealing parts are arranged below the roof tiles in regions where the roof tiles abut each other. The brackets and the sealing parts are arranged without overlap.

In order to mount the roof tiles on the roof construction of EP 2 784 241 A1 it is necessary to use fastening means, such as screws, and appropriate tools.

DESCRIPTION OF THE INVENTION

It is an object of embodiments of the invention to provide a system for mounting glass roof tiles on a roof construction, which allows the glass roof tiles to be mounted without the use of tools and fastening means, such as screws.

It is a further object of embodiments of the invention to provide a system for mounting glass roof tiles on a roof construction, which allows the glass roof tiles to be mounted in an easy and fast manner.

According to a first aspect the invention provides a system for mounting glass roof tiles on a roof construction, the system comprising:
 a roof batten extending along a first longitudinal direction,
 an S-shaped bracket defining a first U-shaped portion and a second U-shaped portion,
 a sealing plate extending along a second longitudinal direction being transverse to the first longitudinal direction, and
 two glass roof tiles arranged side by side along the first longitudinal direction, characterised in that
 the first U-shaped portion of the bracket is clamped onto the roof batten and retained in relation thereto solely by means of friction and gravity, and in that an end portion of the sealing plate and a lower end portion of each of the glass roof tiles are snugly fit into the second U-shaped portion of the bracket, such that the bracket and the sealing plate overlap the respective lower end portions of the two glass roof tiles when the glass roof tiles are arranged side by side along the first longitudinal direction, and such that the sealing plate and the two glass roof tiles are retained in relation to the bracket solely by means of friction and gravity.

Thus, according to the first aspect the invention provides a system for mounting glass roof tiles on a roof construction. In the present context the term 'roof construction' should be interpreted to mean a part of a building which constitutes or forms part of a roof of the building. In the present context the term 'glass roof tile' should be interpreted to mean a roof tile in which at least a surface is made from a glass material. This will be described in further detail below.

The system comprises a roof batten, an S-shaped bracket, a sealing plate and two glass roof tiles.

The roof batten extends along a first longitudinal direction. The first longitudinal direction may, e.g., be a substantially horizontal direction.

The S-shaped bracket defines a first U-shaped portion and a second U-shaped portion. In the present context the term 'U-shaped' should be interpreted to mean a shape which defines two substantially parallel walls interconnected by a wall and an open end arranged opposite the interconnecting wall. Thus the S-shaped bracket is formed from two U-shaped portions arranged with the open ends facing in opposite directions, the two U-shaped portions sharing one of their parallel walls.

The sealing plate extends along a second longitudinal direction being transverse to the first longitudinal direction. Thus, the sealing plate defines a longitudinal direction, i.e. a direction in which the dimension of the sealing plate is larger than the dimensions of the sealing plate in any other direction. Furthermore, the sealing plate is arranged relative to the roof batten in such a way that it extends transversely to the roof batten, e.g. substantially perpendicular to the roof batten.

The two glass roof tiles are arranged side by side along the first longitudinal direction. Thus, the two glass roof tiles are arranged without an overlap, and they are arranged on the same level, relative to first longitudinal direction, and thereby relative to the roof batten.

The first U-shaped portion of the bracket is clamped onto the roof batten. Thereby the bracket is retained in relation to the roof batten solely by means of friction and gravity, i.e. without the use of any additional fastening means, such as screws or the like. Accordingly, the bracket is mounted on the roof batten in an easy and fast manner, while the clamping ensures that the bracket is firmly and securely retained in relation to the roof batten.

Furthermore, an end portion of the sealing plate and a lower end portion of each of the glass roof tiles are snugly fit into the second U-shaped portion of the bracket, such that the bracket and the sealing plate overlap the respective lower end portions of the two glass roof tiles when the glass roof tiles are arranged side by side along the first longitudinal direction. Thus, the bracket as well as the sealing plate extends across a region where the two glass roof tiles abut, and the bracket as well as the sealing plate is arranged in contact with both of the glass roof tiles. Thereby the sealing plate as well as both of the glass roof tiles is mounted to the roof batten in an easy and convenient manner, via the bracket. Furthermore, it is ensured that a correct relative position of the sealing plate and the two glass roof tiles is obtained in an easy and convenient manner.

Since the end portion of the sealing plate and the lower end portions of each of the glass roof tiles are snugly fit into the second U-shaped portion of the bracket, it is further obtained that the sealing plate and the two glass roof tiles are retained in relating to the bracket solely by means of friction and gravity. Accordingly, the sealing plate and the two glass roof tiles are mounted on the bracket without the use of additional fastening means, such as screws. Since the glass roof tiles and the sealing plate are retained by the bracket in this manner, and the bracket is further clamped onto the roof batten as described above, the glass roof tiles and the sealing plate are thereby fixed to and retained relative to the roof batten solely by means of the friction and gravity and without the need for using additional fastening means, such as screws. Accordingly, the glass roof tiles can be mounted on the roof construction in an easy, convenient and fast manner.

At least one of the glass roof tiles may be or comprise a photovoltaic element. In the present context the term 'photovoltaic element' should be interpreted to mean an element which is capable of generating electrical power from energy provided by the sun. Such elements are sometimes referred to as solar cells or solar panels. Thus, according to this embodiment, at least one of the glass roof tiles is capable of producing electrical power. In other words, at least one photovoltaic element is integrated directly into the roof tiles.

All of the glass roof tiles used for the roof may be or comprise a photovoltaic element. In this case the entire surface of the roof contributes to the generation of electrical power. As an alternative, only some of the glass roof tiles may be or comprise a photovoltaic element. In this case only part of the surface of the roof contributes to the generation of electrical power. However, for aesthetic reasons it is desirable that the glass roof tiles which do not comprise photovoltaic elements have an appearance which is very similar to the appearance of the glass roof tiles which comprise photovoltaic elements. Thus, the glass roof tiles without photovoltaic elements will also be provided with a glass surface, and they may be referred to as 'dummy roof tiles'.

The sealing plate may have one or more sealing members mounted thereon. According to this embodiment, the sealing plate may be made from a hard or stiff material, such as a hard plastic material or a metal, such as aluminium. The sealing member(s) may be made from a softer material, such as rubber or a soft plastic material, which allows the sealing plate to form sealing contact with another part, preferably with the glass roof tiles. The sealing member(s) may, e.g., be mounted in appropriate recess(es) formed in the sealing plate.

Preferably, the sealing plate comprises at least one sealing member arranged in contact with a first of the two glass roof tiles and at least one sealing member arranged in contact with a second of the two glass roof tiles, in order to ensure sealing with respect to both of the glass roof tiles. The sealing member being arranged in contact with the first glass roof tile may be the same sealing member which is arranged in contact with the second glass roof tile. As an alternative, separate sealing members may be arranged in contact with the first glass roof tile and the second glass roof tile, respectively.

For instance, the sealing plate may comprise a first sealing member arranged in contact with a first of the two glass roof tiles, a second sealing member arranged in contact with a second of the two glass roof tiles, and a third sealing member arranged in contact with both of the two glass roof tiles. According to this embodiment, a separate sealing member is arranged in contact with each of the respective glass roof tiles. Furthermore, the third sealing member is arranged in contact with both of the glass roof tiles, i.e. it extends across the region where the two glass roof tiles abut. Thereby sealing is ensured in the region where a gap may potentially exist between the two glass roof tiles, and accordingly the risk of leaks in the roof is minimised.

The third sealing member may extend along the entire length of the sealing plate in the second longitudinal direction.

At least one of the one or more sealing members may be releasably fixed to the sealing plate. According to this embodiment, the sealing plate and the sealing members are manufactured separately, e.g. from two different materials, and the sealing members are subsequently mounted on the sealing plate. This allows the sealing plate and the sealing members to be manufactured using standard manufacturing techniques. Furthermore, a sealing member may easily be replaced if this is required.

As an alternative, the sealing plate may be manufactured by means of a two-component moulding process, using two materials having different hardness. Thereby the harder material provides stiffness to the sealing plate and the softer material provides sealing capability. This may reduce the manufacturing costs.

The sealing plate may define at least one resilient surface portion. In the present context the term 'resilient surface portion' should be interpreted to mean a portion of the surface of the sealing plate which is more resilient than the rest of the sealing plate. In particular, the resilient surface portion may be compressible and shape restoring. According to this embodiment, when the sealing plate and the glass roof tiles are inserted into the second U-shaped portion of the bracket, the resilient surface portion(s) may be squeezed, and thereby compressed, in order to allow the sealing plate and the glass roof tiles to move relative to the bracket. Once the sealing plate and the glass roof tiles are in position in the second U-shaped portion of the bracket, the shape of the resilient surface portion(s) is restored, and thereby the sealing plate and the glass roof tiles are retained firmly and securely in the second U-shaped portion of the bracket.

The resilient surface portion may, e.g., be formed by one or more of the sealing members described above. As an alternative, the resilient properties and the sealing properties may be provided by separate elements or surface portions.

The two glass roof tiles may be arranged in a first row, the system further comprising a third glass roof tile of a second row, an upper end portion of the third glass roof tile may overlap the roof batten, and the first U-shaped portion of the bracket may define an inner diameter, and the sum of the thickness the third glass roof tile and the thickness of the roof batten may be dimensioned to securely retain the bracket in relation to the roof batten and the third roof tile solely by means of friction and gravity when the first U-shaped portion of the bracket is clamped onto the roof batten and the upper end portion of the third glass roof tile.

According to this embodiment the glass roof tiles of the roof are arranged in rows. The two glass roof tiles of the system according to the first aspect of the invention are arranged in the same row. A glass roof tile from a neighbouring row, i.e. the third glass roof tile, is arranged in the first U-shaped portion of the bracket, between the roof batten and a side wall of the bracket. Due to the dimension described above, the available space in the first U-shaped portion of the bracket is insufficient to accommodate the roof batten as well as the third glass roof tile. Accordingly, when mounting the bracket on the roof batten and the third glass roof tile, the first U-shaped portion of the bracket must be widened in order to allow the bracket to be clamped onto the roof batten and the third glass roof tile. This may, e.g., be possible due to an inherent flexibility of the bracket, which may be provided by the material thickness of the bracket.

However, once the bracket has been clamped onto the roof batten and the third glass roof tile, it is retained firmly and securely, since the first U-shaped portion of the bracket squeezes the roof batten and the third glass roof tile. This is a very easy, yet secure manner of mounting the bracket on the roof batten.

Similarly, the second U-shaped portion of the bracket may define an inner diameter, and the sum of the thickness of each glass roof tile and the thickness of the sealing plate may be larger than the inner diameter of the second U-shaped portion of the bracket. Thereby the sealing plate and the glass roof tiles can be easily, yet securely mounted in the second U-shaped portion of the bracket, in a manner similar to the mounting of the bracket on the roof batten described above.

In one embodiment of the invention, the first U-shaped portion of the bracket is defined by two mutually spaced wall sections and a connecting section interconnecting the wall sections, wherein each of the wall sections has a height not exceeding the height of the roof batten, so that each of the wall sections is in abutment with the roof batten along the entire height of the respective wall section. The thus limited height of the wall sections contribute to material savings. Further, the limited height allowing the wall sections of the first U-shaped portion of the bracket to lie in abutment with the roof batten along their entire height provide support, by the roof batten, to the wall sections and thus the bracket along their entire height, thus contributing to a stable construction. In particular, as no portion of wall sections extend beyond the roof batten in the second longitudinal direction the wall sections do no constitute levers which would risk causing an undesired tilting or rotating movement or displacement of the sealing plate and tiles supported by the bracket. In a preferred embodiment, to safeguard stability and material savings, no part of the bracket has an extent in the second longitudinal direction exceeding a height of the roof batten by more than 10%. The extent of the bracket in the second longitudinal direction may be approximately equal to the height of the roof batten.

Likewise, the second U-shaped portion preferably rests on an upwardly facing surface of the roof batten to further contribute to stability and ease of mounting.

In order to enhance stability, ease of mounting and manufacture of the bracket, the first and second U-shaped portions thereof may be composed of planar and mutually perpendicular sections. Curved, non-planar portions, hook-shaped elements and the like are thus avoided.

The sealing members preferably extend along the entire length of the sealing plate. The sealing plate preferably extends the entire distance between two adjacent battens.

A planar projection of the sealing plate onto a surface of the roof defined by the roof tiles is preferably rectangular, with no elements, parts or portions of the sealing plate, in said planar projection, extending beyond the bracket when seen in the longitudinal direction of the roof batten in said planar projection. Such configuration contributes to ease of manufacture of the sealing plate, such as, e.g., by extrusion thereof, and conveniently allows storing of the sealing plate and its mounting within the bracket.

The bracket may preferably have an extent in the longitudinal direction of the roof batten which is at least equal to half of the width of the sealing plate. Such extent of the bracket, i.e. of its width, contributes to a stable mounting and support of the sealing plate within the bracket, obviating the need for further mechanical connecting elements, such as hooks, screws or nails, between the sealing plate and the bracket. Thus, mounting is also facilitated by such embodiment. More preferably, the width of the bracket is approximately equal to the full width of the sealing plate, or the bracket may even be wider than the sealing plate. Generally, the width of the bracket may preferably be between 90% and 110% of the width of the sealing plate.

For ease of manufacture and for reasons of mechanical stability the sealing plate may comprise a constant cross-section profile, such as an extruded profile, extending essentially parallel to the roof surface defined by the tiles. Most preferably, the constant cross-section profile has no projections transverse to the direction of extrusion (or in case of a non-extruded, such as moulded sealing plate, transvers to the direction of its directrix).

The sealing plate may have a profile which defines a plurality of recesses formed in one of the surfaces of the sealing plate and extending parallel to the longitudinal direction in the entire length of the sealing plate with a resilient sealing member mounted in each of the recesses. The required fixation of the resilient sealing member may thus be achieved in an inexpensive manner, without the need for a glue, whilst still ensuring a good grip between the sealing plate and the resilient sealing member. The recesses may conveniently be formed in a constant cross-section embodiment of the sealing plate.

The sealing plate and the sealing members may be configured and sized in such a manner that a first one of the sealing members is arranged in contact with only a first one of the glass roof tiles, and a second one of the sealing members is arranged in contact with only a second one of the glass roof tiles. It may thereby be efficiently ensured that two adjacent roof tiles are both in firm contact with the sealing members. A third one of the sealing members may be arranged in a region where the two adjacent glass roof tiles abut one another and thus in contact with both of the glass roof tiles. Thus, sealing is achieved not only in respect of the two adjacent roof tiles, but also in a space between them.

According to a second aspect the invention provides a mounting kit for use in a system according to the first aspect of the invention, the mounting kit comprising an S-shaped bracket having a first U-shaped portion and a second U-shaped portion, and a sealing plate. The bracket and the sealing plate have already been described in detail above with reference to the first aspect of the invention.

According to a third aspect the invention provides a method for mounting glass roof tiles on a roof construction using a system according to the first aspect of the invention, the method comprising the steps of:
 providing a roof batten extending along a first longitudinal direction,
 providing an S-shaped bracket defining a first U-shaped portion and a second U-shaped portion,
 mounting the bracket on the roof batten by clamping the first U-shaped portion of the bracket onto the roof batten, thereby retaining the bracket in relation to the roof batten solely by means of friction and gravity, and
 mounting a sealing plate and two glass roof tiles on the bracket by snugly fitting an end portion of the sealing plate and a lower end portion of each of the glass roof tiles into the second U-shaped portion of the bracket, such that the two glass roof tiles are arranged side by side along the first longitudinal direction, and such that the bracket and the sealing plate overlap the respective lower end portions of the two glass roof tiles, thereby retaining the sealing plate and the two glass roof tiles in relation to the bracket solely by means of friction and gravity.

It should be noted that a person skilled in the art would readily recognise that any feature described in combination with the first aspect of the invention could also be combined with the second or third aspects of the invention, and vice versa. The remarks set forth above with reference to the first aspect of the invention are therefore equally applicable here.

In the method according to the third aspect of the invention, a roof batten extending along a first longitudinal direction is initially provided. The roof batten may already form part of a roof construction. The roof batten has already been described above with reference to the first aspect of the invention.

Next, an S-shaped bracket defining a first U-shaped portion and a second U-shaped portion is provided. The bracket has already been described above with reference to the first aspect of the invention.

Next, the bracket is mounted on the roof batten by clamping the first U-shaped portion of the bracket onto the batten. As described above with reference to the first aspect of the invention, the bracket is thereby retained in relation to the roof batten solely by means of friction and gravity.

Finally, a sealing plate and two glass roof tiles are mounted on the bracket by snugly fitting an end portion of the sealing plate and a lower end portion of each of the glass roof tiles into the second U-shaped portion of the bracket. The two glass roof tiles are arranged side by side along the first longitudinal direction, and the bracket and the sealing plate overlap the respective lower end portions of the two glass roof tiles. As described above with reference to the first aspect of the invention the sealing plate and the two glass roof tiles are thereby retained in relation to the bracket solely by means of friction and gravity.

The invention further provides a roof construction comprising a plurality of systems according to the first aspect of the invention and/or which has been mounted using a method according to the third aspect of the invention, as well as a building comprising such a roof construction.

BRIEF DESCRIPTION OF THE DRAWINGS

The invention will now be described in further detail with reference to the accompanying drawings in which.

DETAILED DESCRIPTION OF THE DRAWINGS

Figure 1:
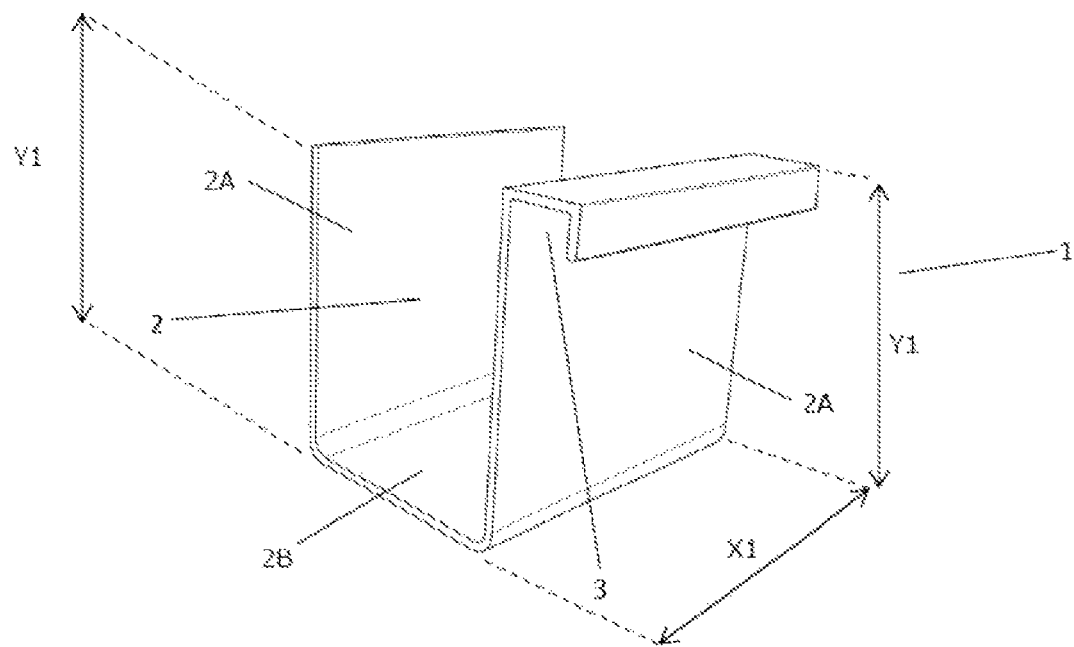
FIGS. 1 and 2 are perspective views of an S-shaped bracket for a system according to an embodiment of the invention, seen from two different directions.
Figure 2:
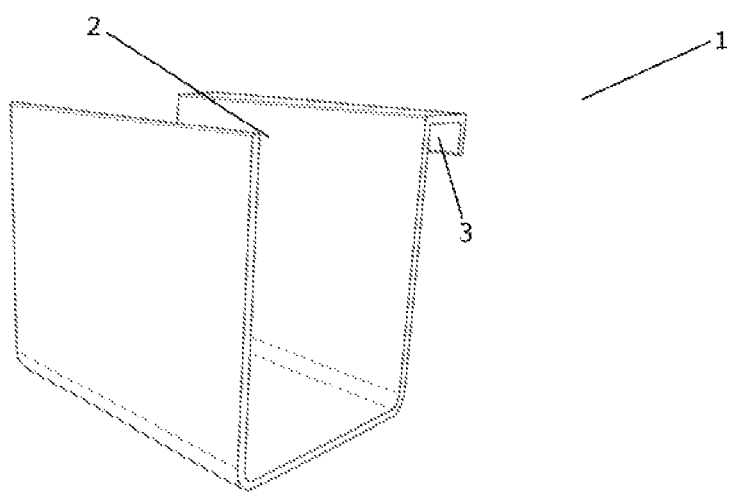

FIGS. 1 and 2 are perspective views of an S-shaped bracket 1 for a system according to an embodiment of the invention, seen from two directions. The bracket 1 comprises a first U-shaped portion 2 and a second U-shaped portion 3. The open ends of the U-shaped portions 2, 3 face in opposite directions, and thereby the two U-shaped portions 2, 3 form the S-shape of the bracket 1.

It can be seen that the space available inside the first U-shaped portion 2 is significantly larger than the space available inside the second U-shaped portion 3. Accordingly, larger items can be accommodated within the first U-shaped portion 2 than within the second U-shaped portion 3.

Figure 3:
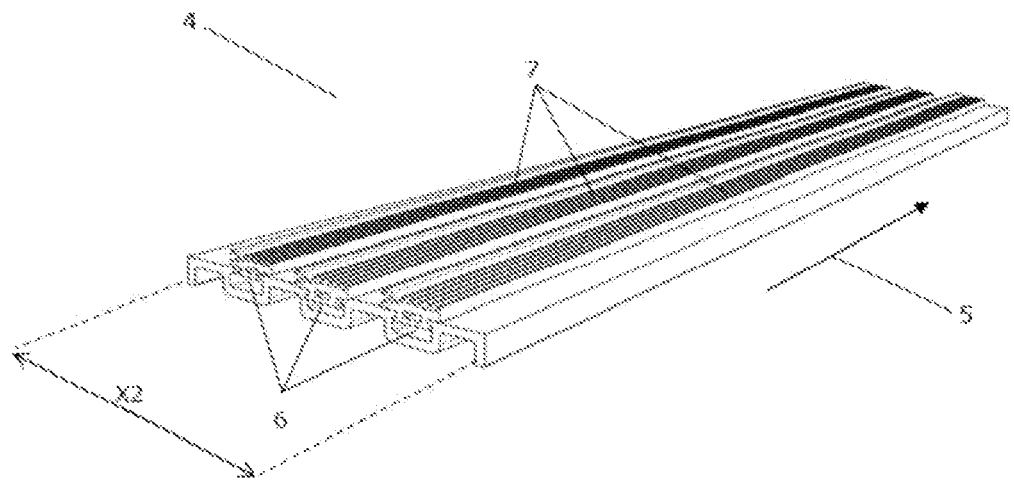
FIGS. 3 and 4 are perspective views of a sealing plate for a system according to an embodiment of the invention, seen from two different directions.
Figure 4:
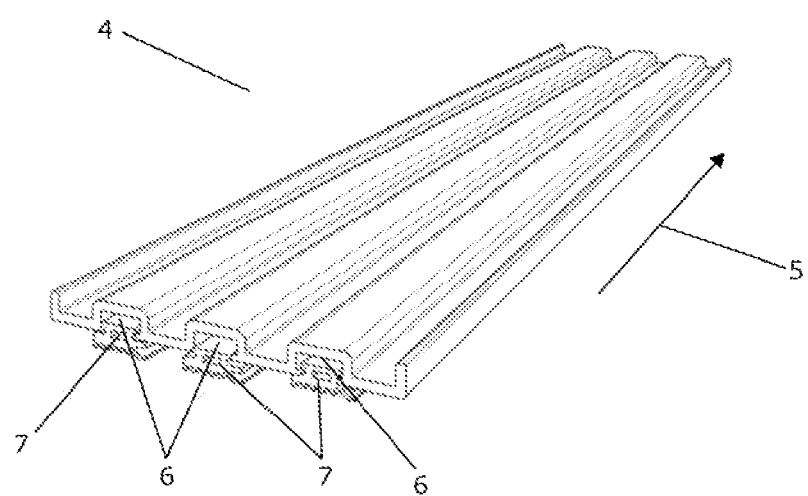

FIGS. 3 and 4 are perspective views of a sealing plate 4 for a system according to an embodiment of the invention, seen from two directions. The sealing plate 4 extends along a longitudinal direction, indicated by arrow 5. Thus, the dimension of the sealing plate 4 along the longitudinal direction 5 is significantly larger than the dimension of the sealing plate 4 along any other direction. The sealing plate 4 is made from a rigid material, e.g. aluminium or a hard plastic material.

The sealing plate 4 has a profile which defines three recesses 6 formed in one of the surfaces of the sealing plate 4. The recesses 6 extend parallel to the longitudinal direction 5 and in the entire length of the sealing plate 4. A resilient sealing member 7 is mounted in each of the recesses 6. The sealing members 7 are made from a material which is softer, and thereby more resilient, than the material of the sealing plate 4, e.g. rubber or a soft plastic material. This allows the sealing members 7 to provide sealing towards another part arranged in contact with the sealing members 7. Furthermore, the sealing members 7 may be compressed, and thereby a force which seeks to restore the shape of the sealing members 7 may contribute to retaining the sealing plate 4, and possibly other parts arranged in contact with the sealing plate 4. This will be described in further detail below with reference to FIGS. 8 and 9.

Figure 5:
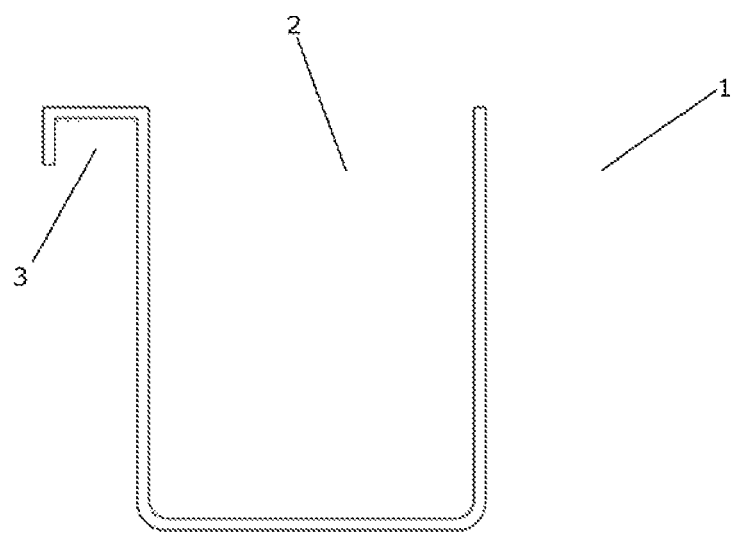
FIG. 5 is a cross sectional view of the bracket of FIGS. 1 and 2.

FIG. 5 is a cross sectional view of the bracket 1 of FIGS. 1 and 2. The first U-shaped portion 2 and the second U-shaped portion 3 can be clearly seen.

Figure 6:
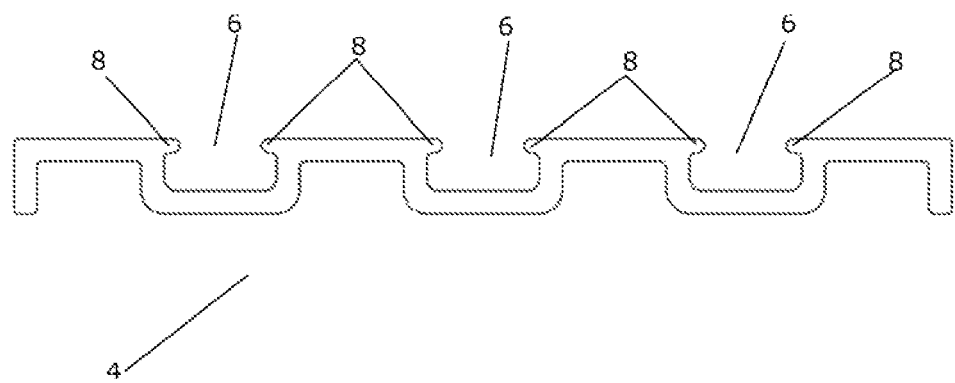
FIG. 6 is a cross sectional view of the sealing plate of FIGS. 3 and 4.

FIG. 6 is a cross sectional view of the sealing plate 4 of FIGS. 3 and 4, without the sealing members mounted thereon. The recesses 6 can be clearly seen. It can further be seen that each of the recesses 6 is provided with protruding portions 8 which are configured to retain a sealing member in the recess 6.

Figure 7:
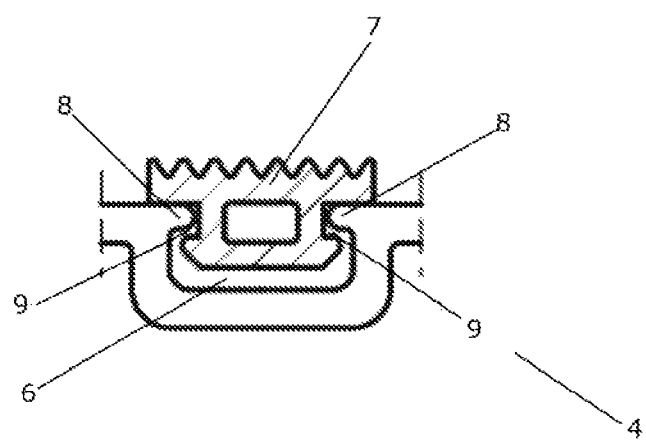
FIG. 7 is a detail of the sealing plate of FIG. 6 with a sealing member mounted thereon.

FIG. 7 shows a detail of the sealing plate 4 of FIG. 6, illustrating one of the recesses 6 with a sealing member 7 mounted therein. It can be seen that the protruding portions 8 engage corresponding recesses 9 formed in the sealing member 7, thereby retaining the sealing member 7 in the recess 6.

Figure 8:
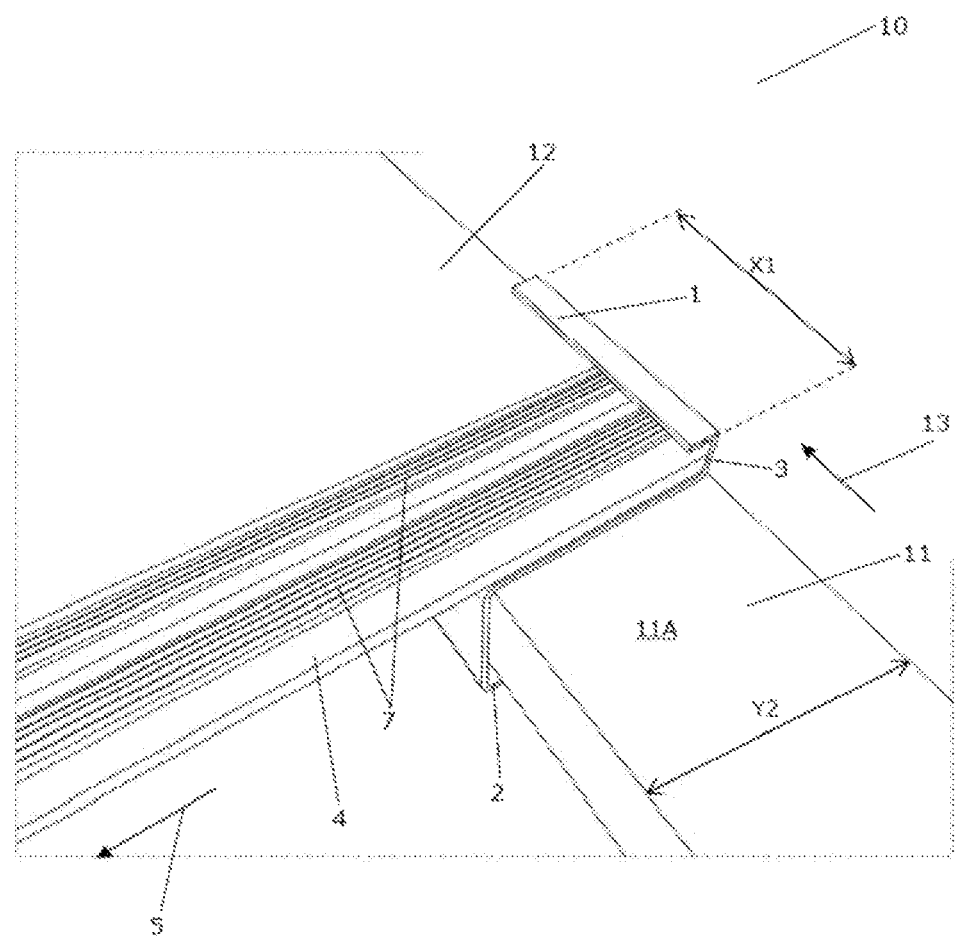
FIGS. 8 and 9 are perspective views of a system according to an embodiment of the invention.
Figure 9:
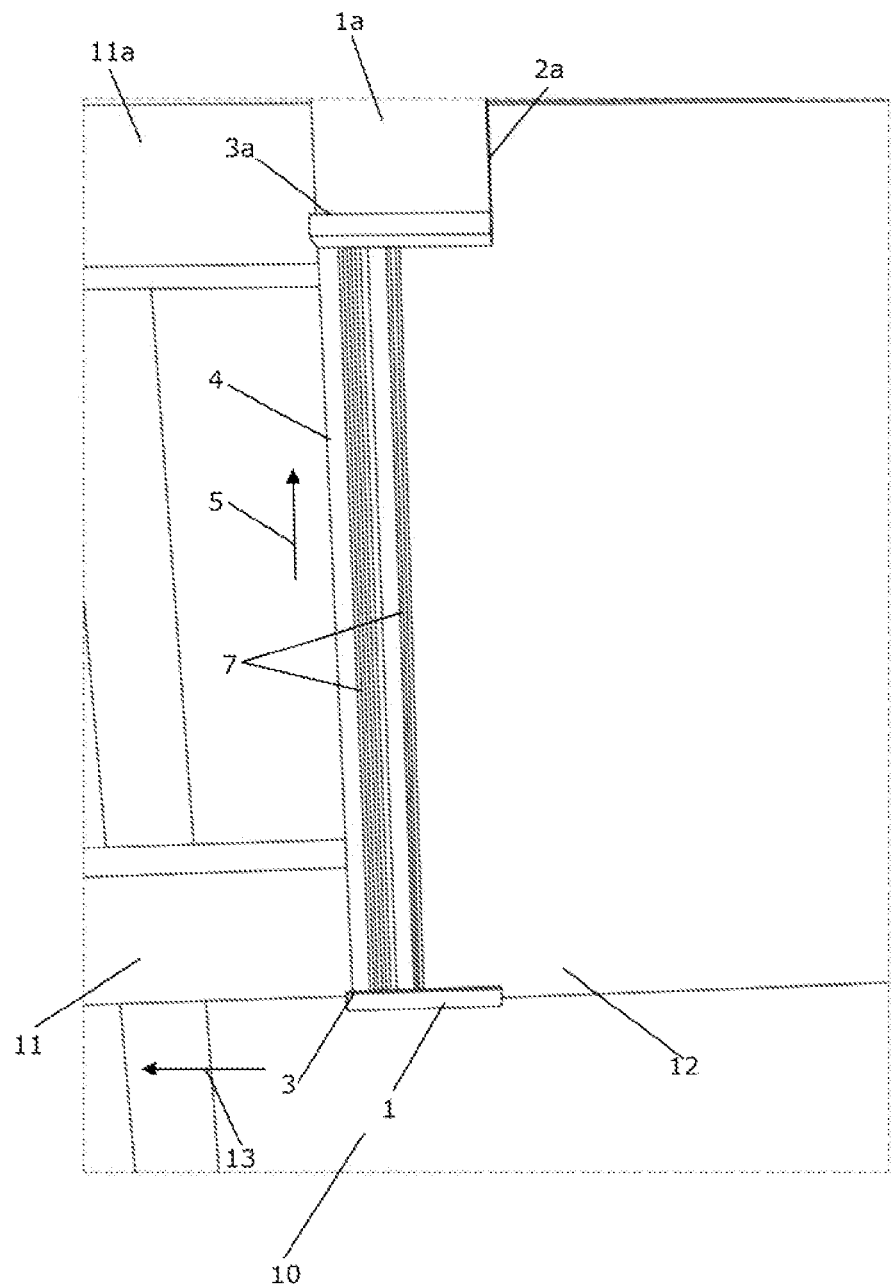

FIGS. 8 and 9 are perspective views of a system 10 according to an embodiment of the invention for mounting glass roof tiles on a roof construction. The system 10 comprises a roof batten 11, an S-shaped bracket 1, a sealing plate 4 and two glass roof tiles 12, one of which is shown. The glass roof tiles 12 could, e.g., be in the form of or comprise photovoltaic elements.

The roof batten 11 extends along a first longitudinal direction, illustrated by arrow 13. The first longitudinal direction 13 may advantageously be substantially horizontal and/or substantially parallel to the ground.

The S-shaped bracket 1 comprises a first U-shaped portion 2 and a second U-shaped portion 3. The bracket 1 may, e.g., be the bracket 1 illustrated in FIGS. 1, 2 and 5.

The sealing plate 4 extends along a second longitudinal direction, illustrated by arrow 5. The second longitudinal direction 5 is transverse to the first longitudinal direction 13, i.e. the sealing plate 4 extends transversely to the roof batten 11. The sealing plate 4 further has three sealing members 7 mounted thereon, two of which are shown. The third sealing member 7 is arranged between the sealing plate 4 and the glass roof tile 12, and thereby in sealing contact with the glass roof tile 12. The sealing plate 4 may, e.g., be the sealing plate 4 illustrated in FIGS. 3, 4, 6 and 7.

The first U-shaped portion 2 of the bracket 1 is clamped onto the roof batten 11, i.e. a portion of the roof batten 11 is arranged in the first U-shaped portion 2 of the bracket 1. Thereby the bracket 1 is retained in relation to the roof batten 11 solely by means of friction and gravity, i.e. no additional fastening means, such as screws, are required in order to retain the bracket 1 relative to the roof batten 11.

An end portion of the sealing plate 4 and a lower end portion of the glass roof tile 12 are snugly fit into the second U-shaped portion 3 of the bracket 1. Normally, an additional glass roof tile will be positioned with a lower end portion in the second U-shaped portion 3 of the bracket 1 in such a manner that the glass roof tiles 12 are arranged side by side along the first longitudinal direction 13. However, in FIGS. 8 and 9 the additional glass roof tile has been removed in order to reveal details of the sealing plate 4.

Thereby the bracket 1 as well as the sealing plate 4 overlaps the respective lower end portions of the glass roof tiles 12, and the bracket 1 as well as the sealing plate 4 bridges the region where the two glass roof tiles 12 abut. Furthermore, the bracket 1 as well as the sealing plate 4 is arranged in contact with both of the glass roof tiles 12.

The sealing members 7 are arranged in such a manner that a first sealing member 7 is arranged in contact with only a first of the glass roof tiles 12, a second sealing member 7 is arranged in contact with only a second of the glass roof tiles 12, and a third sealing member 7 is arranged in the region where the two glass roof tiles 12 abut, and thereby in contact with both of the glass roof tiles 12. Thereby appropriate sealing is provided between the glass roof tiles 12 and the sealing plate 4.

When inserting the sealing plate 4 and the glass roof tiles 12 into the second U-shaped portion 3 of the bracket 1, the sealing members 7 are compressed in order to allow the sealing plate 4 and the glass roof tiles 12 to move relative to the bracket 1. Once the sealing plate 4 and the glass roof tiles 12 are in position, the pressure on the sealing members 7 is released, and they will seek to restore their original shape. Thereby the sealing plate 4 and the glass roof tiles 12 are retained firmly in relation to the bracket 1 solely by means of friction and gravity. Since both of the glass roof tiles 12 are retained by the bracket 1, due to the bracket 1 and the sealing plate 4 bridging the region where the glass roof tiles 12 abut, a correct relative position of the sealing plate 4 and the two glass roof tiles 12 is obtained in an easy and convenient manner.

In summary, the bracket 1 is retained in relation to the roof batten 11 and the glass roof tiles 12 are retained in relation to the bracket 1, solely by means of friction and gravity. Accordingly, the glass roof tiles 12 are retained in relation to the roof batten 12 solely by means of friction and gravity, i.e. without the need for additional fastening means, such as screws. This allows the glass roof tiles 12 to be mounted on the roof construction in an easy, fast and convenient manner, possibly without the use of tools.

In FIG. 9 an additional roof batten 11a and an additional bracket 1a are shown. The additional bracket 1a is clamped onto the additional roof batten 11a in the same manner in which the bracket 1 is clamped onto the roof batten 11, i.e. as described above. It can be seen that the sealing plate 4 and the glass roof tile 12 are arranged in the first U-shaped portion 2a of the additional bracket 1a. An additional sealing plate and two additional glass roof tiles can be inserted into the second U-shaped portion 3a of the additional bracket 1a, in the manner described above. These additional glass roof tiles will then form part of another row of glass roof tiles arranged above the glass roof tile illustrated in FIGS. 8 and 9. Similarly, glass roof tiles arranged in a lower row of glass roof tiles may be inserted into the first U-shaped portion 2 of the bracket 1 along with the roof batten 11.

The first U-shaped portion 2 of the bracket 1 is defined by two mutually spaced wall sections 2A and a connecting section 2B interconnecting the wall sections 2A. Each of the wall sections 2A has a height Y1 (see FIG. 1) not exceeding the height Y2 (FIG. 8) of the roof batten 11, so that each of the wall sections 2A is in abutment with the roof batten 11 along the entire height Y1) of the respective wall section 2A.

The bracket 1 preferably has an extent X1 (FIG. 1) in the longitudinal direction of the roof batten 11 which is at least equal to half of the width X2 (FIG. 3) of the sealing plate.

The invention claimed is:

1. A system for mounting glass roof tiles on a roof construction, the system comprising:
    a roof batten extending along a first longitudinal direction,
    a S-shaped bracket defining a first U-shaped portion and a second U-shaped portion,
    a sealing plate extending along a second longitudinal direction being transverse to the first longitudinal direction, and
    two glass roof tiles arranged side by side along the first longitudinal direction,
    wherein the first U-shaped portion of the S-shaped bracket is clamped onto the roof batten and retained in relation thereto solely by means of friction and gravity, and in that an end portion of the sealing plate and a lower end portion of each of the two glass roof tiles are snugly fit into the second U-shaped portion of the S-shaped bracket, such that the S-shaped bracket and the sealing plate overlap the respective lower end portions of the two glass roof tiles when the two glass roof tiles are arranged side by side along the first longitudinal direction, and such that the sealing plate and the two glass roof tiles are retained in relation to the S-shaped bracket solely by means of friction and gravity;
    wherein the first U-shaped portion of the S-shaped bracket is defined by two mutually spaced wall sections and a connecting section interconnecting the wall sections, and
    wherein each of the wall sections has a height not exceeding the height of the roof batten, so that each of the wall sections is in abutment with the roof batten along an entire height of the respective wall section.

2. The system according to claim 1, wherein at least one of the two glass roof tiles is or comprises a photovoltaic element.

3. The system according to claim 1, wherein the sealing plate has one or more sealing members mounted thereon.

4. The system according to claim 3, wherein the one or more sealing members mounted on the sealing plate comprises a first sealing member arranged in contact with a first of the two glass roof tiles, a second sealing member arranged in contact with a second of the two glass roof tiles, and a third sealing member arranged in contact with both of the two glass roof tiles.

5. The system according to claim 3, wherein at least one of the one or more sealing members is releasably fixed to the sealing plate.

6. The system according to claim 1, wherein the sealing plate defines at least one resilient surface portion.

7. The system according to claim 1, wherein the two glass roof tiles are arranged in a first row, the system further comprising a third glass roof tile of a second row, wherein an upper end portion of the third glass roof tile overlaps the roof batten, and wherein the first U-shaped portion of the S-shaped bracket defines an inner dimension, and wherein the sum of the thickness the third glass roof tile and the thickness of the roof batten are dimensioned to securely retain the S-shaped bracket in relation to the roof batten and the third roof tile solely by means of friction and gravity when the first U-shaped portion of the S-shaped bracket is clamped onto the roof batten and the upper end portion of the third glass roof tile.

8. The system according to claim 1, wherein the second U-shaped portion of the S-shaped bracket defines an inner dimension, and wherein a sum of a thickness of each glass roof tile and the thickness of the sealing plate is larger than the inner dimension of the second U-shaped portion of the S-shaped bracket.

9. The system according to claim 1, wherein the S-shaped bracket has an extent in the second longitudinal direction not exceeding a height of the roof batten by more than 10%.

10. The system according to claim 1, wherein the first U-shaped portion of the S-shaped bracket and second U-shaped portion of the S-shaped bracket are composed of planar and mutually perpendicular sections.

11. The system according to claim 1, wherein the sealing plate is rectangular when seen in a planar projection onto a surface of the roof defined by the roof tiles, with no elements, parts or portions of the sealing plate extending beyond the S-shaped bracket when seen in the longitudinal direction of the roof batten in said planar projection.

12. A system for mounting glass roof tiles on a roof construction, the system comprising:

a roof batten extending along a first longitudinal direction, a S-shaped bracket defining a first U-shaped portion and a second U-shaped portion, a sealing plate extending along a second longitudinal direction being transverse to the first longitudinal direction, and two glass roof tiles arranged side by side along the first longitudinal direction, wherein the first U-shaped portion of the S-shaped bracket is clamped onto the roof batten and retained in relation thereto solely by means of friction and gravity, and in that an end portion of the sealing plate and a lower end portion of each of the two glass roof tiles are snugly fit into the second U-shaped portion of the S-shaped bracket, such that the S-shaped bracket and the sealing plate overlap the respective lower end portions of the two glass roof tiles when the two glass roof tiles are arranged side by side along the first longitudinal direction, and such that the sealing plate and the two glass roof tiles are retained in relation to the S-shaped bracket solely by means of friction and gravity;

wherein the second U-shaped portion rests on an upwardly facing surface of the roof batten.

13. A system for mounting glass roof tiles on a roof construction, the system comprising:

a roof batten extending along a first longitudinal direction, an S-shaped bracket defining a first U-shaped portion and a second U-shaped portion, a sealing plate extending along a second longitudinal direction being transverse to the first longitudinal direction, and two glass roof tiles arranged side by side along the first longitudinal direction, wherein the first U-shaped portion of the S-shaped bracket is clamped onto the roof batten and retained in relation thereto solely by means of friction and gravity, and in that an end portion of the sealing plate and a lower end portion of each of the two glass roof tiles are snugly fit into the second U-shaped portion of the S-shaped bracket, such that the S-shaped bracket and the sealing plate overlap the respective lower end portions of the two glass roof tiles when the two glass roof tiles are arranged side by side along the first longitudinal direction, and such that the sealing plate and the two glass roof tiles are retained in relation to the S-shaped bracket solely by means of friction and gravity;

wherein the S-shaped bracket has an extent in the longitudinal direction of the roof batten which is at least equal to half of a width of the sealing plate.

14. The system according to claim 1, wherein the two glass roof tiles define a substantially planar roof surface extending parallel to the second longitudinal direction, and wherein the sealing plate comprises an extruded profile extending parallel to the roof surface.

15. A method for mounting glass roof tiles on a roof construction, the method comprising the steps of:

providing a roof batten extending along a first longitudinal direction, providing a S-shaped bracket defining a first U-shaped portion and a second U-shaped portion, mounting the S-shaped bracket on the roof batten by clamping the first U-shaped portion of the S-shaped bracket onto the roof batten, thereby retaining the S-shaped bracket in relation to the roof batten solely by means of friction and gravity, and mounting a sealing plate and two glass roof tiles on the S-shaped bracket by snugly fitting an end portion of the sealing plate and a lower end portion of each of the two glass roof tiles into the second U-shaped portion of the S-shaped bracket, such that the two glass roof tiles are arranged side by side along the first longitudinal direction, and such that the S-shaped bracket and the sealing plate overlap the respective lower end portions of the two glass roof tiles, thereby retaining the sealing plate and the two glass roof tiles in relation to the S-shaped bracket solely by means of friction and gravity;

wherein the first U-shaped portion of the bracket is defined by two mutually spaced wall sections and a connecting section interconnecting the wall sections, and wherein each of the wall sections has a height not exceeding the height of the roof batten, so that each of the wall sections is in abutment with the roof batten along an entire height of the respective wall section.

* * * * *